Nov. 5, 1963 — W. STEIMAN ETAL — 3,109,625
VALVE CONSTRUCTION FOR AEROSOL-PRODUCING DEVICE
Filed Dec. 14, 1959 — 2 Sheets-Sheet 1

INVENTOR.
William R. O'Donnell
BY Wolf Steiman
H. Gibner Lehmann
AGENT

Nov. 5, 1963  W. STEIMAN ETAL  3,109,625
VALVE CONSTRUCTION FOR AEROSOL-PRODUCING DEVICE
Filed Dec. 14, 1959  2 Sheets-Sheet 2

INVENTOR.
William R. O'Donnell
BY Wolf Steiman
AGENT

United States Patent Office 3,109,625
Patented Nov. 5, 1963

3,109,625
VALVE CONSTRUCTION FOR AEROSOL-PRODUCING DEVICE
Wolf Steiman, Fairfield, and William R. O'Donnell, Trumbull, Conn., assignors to VCA Incorporated, Bridgeport, Conn., a corporation of Connecticut
Filed Dec. 14, 1959, Ser. No. 859,482
1 Claim. (Cl. 251—353)

This invention relates to small hand-held devices which are arranged for dispensing various substances contained under pressure in a pressurized container, and more particularly to the valve structures of such devices.

A currently widely used type of valve construction employed in small pressurized devices comprises a longitudinally movable valve actuator in the form of a stem having a passage through it for the substance and having an exterior enlargement providing a valve face which is engageable with an annular or washer-like valve seat of rubber or similar substance. The annular valve seal is mounted within a formed sheet metal mounting cup or member, through which the valve stem extends and in which it has a bearing.

To guide the valve stem and provide the necessary bearing therefor the sheet metal cup or mounting member is formed to provide a flange or collar at the opening through which the stem extends. Thus, the mounting member has as an integral part a metal collar, through which the stem passes and in which it is longitudinally slidable, the collar constituting the main bearing for the valve stem.

This construction, involving a longitudinally movable stem and metal sleeve bearing therefor on the mounting cup necessitates the provision of a snug sliding fit between these parts to minimize leakage and provide an effective guide. However, due to the thin sheet metal material involved, the rigid bearing sleeve distorts and deforms when the device is put into use, especially because substantial lateral pressures are produced on the sleeve as a consequence of the act of depressing the stem actuator button. This ultimately results in leakage of the pressurized substance past the exterior of the stem, making the operation of the device messy and wasteful.

Normally leakage of the pressurized substance past the valve stem does not occur when the valve is closed for the reason that the valve face or enlargement on the stem engages the annular valve seat under continual pressure, and the seat in turn engages the inside of the sheet metal mounting cup, providing an effective seal due to the opposed pressures on the opposite sides of the valve seat. Such opposed pressures are in the nature of a clamping action, and are effective, when the valve stem is in closed position, for preventing the undesired leakage past the exterior of the stem. However, when the valve stem is actuated to open the valve, the said clamping pressures no longer exist and instead dependence must be had upon the questionable bearing fit between the bore of the annular valve seat and the exterior surface of the valve stem. At these points the pressure or force of engagement is not especially great, with the result that undesired leakage occurs past the exterior of the valve stem, and is not stopped by the bearing sleeve for the stem, such leakage being at times quite appreciable especially when the valve seat and bearing sleeve are worn and do not maintain a tight fit.

The above disadvantages and drawbacks of prior valve structures of the kind outlined above are obviated by the present invention, and one object of the invention is to provide a novel and improved valve construction which is extremely effective in preventing leakage of the pressurized substance past the exterior of the valve stem, for both the open and closed positions of the valve.

Another object of the invention is to provide a novel and improved valve construction as above set forth, which has an extremely easy and smooth action when the valve stem is operated to open and close the valve.

Yet another object of the invention is to provide an improved valve construction wherein there is minimized and reduced to the greatest possible extent the tendency for wear to occur between the valve stem and the cooperable bearing and sealing surfaces, thereby to obtain a desirable leak-proof operation over an extended period of use.

A still further object of the invention is to provide an improved valve construction as above set forth, which is extremely simple in its construction, involving relatively few parts whereby the fabrication and manufacturing costs may be held to a low figure.

A feature of the invention resides in the provision of a novel resilient valve part through which the valve stem extends and on which it bears, the said resilient part being constituted as a one-piece combined seal, valve seat and bearing sleeve for the valve stem which at one and the same time provides a reliable easy-acting bearing and an effective static seal when the valve is closed, and also an effective and reliable dynamic seal preventing leakage past the valve stem when the valve is actuated and open.

Another feature of the invention resides in the provision of a novel valve construction employing relatively few, simple components, wherein the assembly of the various components may be easily and quickly effected, at a minimum cost.

Yet another object of the invention is to provide an improved valve construction as outlined above, which is characterized by a resilient valve stem bearing and by opposed forces acting on the said valve stem bearing in a manner similar to a clamping action, thereby to effect a tight seal with the valve stem at the time that the valve is open and prevent leakage of the pressurized substance past the stem exterior.

Still another feature of the invention resides in the provision of a novel, resilient non-metallic valve part constituted as a one-piece seal, valve seat and bearing sleeve, which part is so arranged that it has an interlocking engagement with the metallic mounting cup or member, thereby to more securely position the part in the member against relative movement.

Other features and advantages will hereinafter appear.

In the drawings accompanying this specification similar characters of reference have been used to designate like components throughout the several views, in which.

Figure 1:
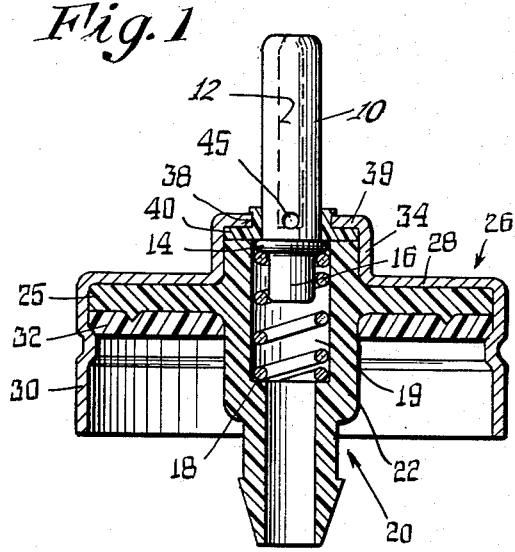
FIGURE 1 is an axial sectional view of an improved non-metering valve construction as provided by the invention, for narrow mouthed containers, the valve stem being shown in elevation, in valve-closing position.

Referring first to FIG. 1, the improved valve construction as illustrated therein comprises a hollow valve stem 10 of a known kind, said stem having a bore 12 extending axially to provide for passage of the pressurized substance. The valve stem 10 has an exterior enlargement or annular shoulder 14 providing a valve face, and has a depending portion 16 below the shoulder 14, about which a helical compression coil spring 18 is disposed, the said spring being carried within the central bore 19 of a housing member 20 which may be constituted of molded plastic, cast or molded metal or other suitable material, as will be understood. The valve stem 10 may be constituted of any suitable material, such as plastic, metal or the like, and details of the construction of such stem are not given herein since per se they form no part of the present invention. The housing 20 is shown as having a main or body portion 22 from which there depends a hollow extension 23 adapted to carry a dip tube (not shown) in the well-known manner. The housing 20 has a relatively large annular external flange 25 disposed between its upper and lower ends, said flange closely fitting within a sheet metal mounting cup or member 26 having a top wall portion 28 engaged with the upper surface of the flange 25. The mounting member 26 has a depending cylindrical flange or skirt 30 adapted to engage the neck or lip of the container, to secure the valve construction thereto. Within the mounting cup 26 a resilient gasket or washer 32 is provided, engaged with the lower surface of the annular flange 25 and adapted to engage the lip of the container, to effect a seal therewith.

The top wall 28 of the mounting cup 26 is provided with a central, upwardly dished portion 34 surrounding the upper end portion of the housing 20 and closely fitting thereto.

In accordance with the present invention, in conjunction with the valve stem 10 and the sheet metal mounting cup or member 26 and valve housing 20 there is provided a novel, resilient part 36 (FIGS. 1–3) through which the valve stem 10 extends and on which it bears, the said resilient part being constituted as a one-piece combined seal, valve seat and bearing sleeve for the valve stem. The part 36 is preferably non-metallic and formed of yieldable and deformable resilient plastic substance, as for example linear polyethylene or equivalent synthetic material. The part 36 is constituted and arranged to extend into an opening 38 provided in the upper flat wall 39 of the dished portion 34 of the mounting cup 26, and the part is held against movement with respect to the mounting cup, as will hereinafter be disclosed.

Figure 2:
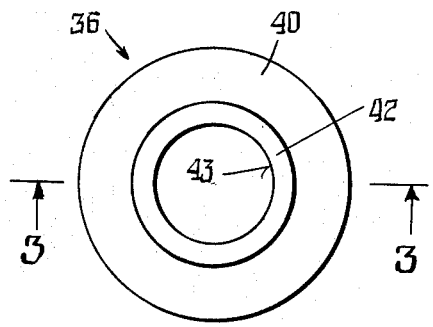
FIG. 2 is a top plan view of the novel one-piece combined seal, valve seat and bearing sleeve of the valve construction as provided by the invention.
Figure 3:
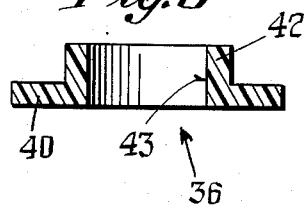
FIG. 3 is a diametric section taken on the line 3—3 of FIG. 2.

Referring to FIGS. 1–3, the non-metallic part 36 has an annular body portion 40 which is disposed against the undersurface of the top wall 39 of the cup portion 34 in sealing engagement therewith. Also, the part 36 has an annular shoulder portion 42 projecting from one side of the body portion 40 and extending into the opening 39 of the mounting cup 26, thereby to constitute a bushing in said cup, the shoulder portion 42 slidably carrying the valve stem 10 and constituting a bearing for such stem. The part 36 also has a valve seat, constituted by the lower portion of the part, which surrounds a central opening 43, for engagement with the valve shoulder 14 of the stem 10.

Preferably, in accordance with the invention, when the part 36 is initially formed or molded, the diameter of the opening or bore 43 is made slightly smaller than the outside diameter of the shank of the valve stem 10 which the part is to carry, and the outside diameter of the annular shoulder portion 42 is chosen to provide a snug fit between such portion and the edge of the opening 38 in the mounting cup 46. Also, the external diameter of the body portion 40 of the part is chosen as to have a press fit in the cylindrical wall 34 of the upwardly dished portion of the mounting cup 26.

By such construction, the combined seal, valve seat and bearing part 36 may be readily fitted in its proper place within the mounting cup 26. After assembly of the part 36 to the mounting cup 26, the valve stem 10 is inserted in the part from the bottom and pushed to the position shown in FIG. 1. The somewhat larger diameter of the shank of the valve stem 10 will expand slightly the annular shoulder portion 42 of the part 36, and said shoulder portion when expanded will be forced against and compressed by the edge of the opening 38 of the mounting cup 26.

Thus, there exists a positive or non-yielding pair of opposed surfaces pressing respectively outward and inward against the inner and outer cylindrical surfaces of the annular shoulder portion 42, and it will be readily understood that this is in the nature of a clamping action, which is of importance as will be later brought out. Referring to FIG. 1 the one-piece combined seal, valve seat and sleeve part 36 is also subjected to a second clamping-type sealing pressure, exerted on the opposite or upper and lower faces of the body portion 40 of the part. The valve housing 20 at its upper end presses upward against the lower face of the body portion 40, whereas the top wall 39 of the upwardly dished portion 34 of the mounting cup presses the upper face of the body portion 40. We have found that this clamping type action, utilizing opposed forces exerted by unyielding parts, is extremely effective in preventing leakage of the contents of the device, not only when the valve is in its closed condition as shown in FIG. 1, but which is equally important, when the valve is in the open condition as accomplished by the pressing of the valve stem 10 downward against the action of the compression return spring 18. For such depressed position of the valve stem 10 a side opening 45 thereof, which communicates with the central bore 12, is brought below the part 36 and in communication with the bore 19 of the valve housing 20. Accordingly, the substance may be discharged through the valve stem via the opening 45 and the channel or passage 12. Upon the valve stem being released, the return spring 18 will again shift it upward to the position of FIG. 1, wherein the valve shoulder 14 will seal against the undersurface of the part 36 to shut off the flow of the substance.

It will be understood that whether or not the valve stem 10 is depressed to effect discharge of the substance there will always exist the opposed clamping-type pressures on the annular shoulder portion 42 of the sealing part 36 as exerted by the stem 10 on the one hand and the edge of the opening 38 of the mounting cup 26 on the other hand. These clamping-type pressures will at all times effectively prevent leakage of the pressurized substance past the exterior of the valve stem, thereby providing a highly desirable valve construction for the device which is proof against leakage both when the device is stored and when it is in use. Moreover, by constituting the sealing part 36 of a resilient wear-resistant substance such as linear polyethylene or a similar formulation, there is minimized any tendency for the parts to become misfit or to wear, and accordingly the opposed pressures exerted on the shoulder portion 42 will continue to be effective for preventing leakage during the useful life of the device. Moreover, the use of a linear polyethylene formulation which provides a smooth and slippery surface further minimizes wear and provides a soft and smooth, desirable action of the valve stem when it is actuated to open or close the valve. We have found that with the above improved valve construction a sturdy yet slightly yieldable bearing is had for the valve stem 10, especially in conjunction with the confined coil spring 18 encircling the lower, depending portion 16 of the valve stem. Further, by virtue of the valve enlargement 14 being formed with a diameter substantially of the same order of magnitude as the diameter of the opening 38 in the mounting cup 26 there is little tendency for distortion of the sealing valve part 36 to occur during storage or use of the device. No appreciable cold flow of the valve part occurs due to the force exerted by the spring 18 and the pressure within the aerosol container, which might impair the operation or effectiveness of the valve construction.

By virtue of the slight expansion of the shoulder portion 42 of the part 36 which is effected by the interference fit of the valve stem 10 when the latter is inserted after the part 36 has been assembled to the cup 26, the top edge of the shoulder portion 42 will have an enlarged diameter, as compared with the diameter of the opening 38, thereby causing the portion 42 to bulge out slightly resulting in an interlocking engagement of the part 36 with the mounting cup 26. This aids in the retention of the part 36 in the cup and further tends to prevent undesired movement of the part with respect to the cup.

It will be noted from FIG. 1 that the edges of the opening 38 have a thickness which is substantially the same as the thickness of the sheet metal of the mounting cup 26, since the portion of the cup around the opening has not been drifted or flanged at all but instead merely cut clean through, to provide a clean opening. Moreover, due to the resilience of the part 36 the size of the opening 38 is not critical. Accordingly, there is avoided the necessity of any secondary operations, as in finishing a drifted hole or the like. Also, the provision of the yieldable and resilient sealing part 36 not only provides an effective seal but also eliminates the necessity for close tolerances being held as regards the valve stem 10 as well as the sheet metal mounting part 26, which were heretofore required. Thus, there is effected an economy in the manufacture of the valve construction.

By virtue of the sealing and bearing part 36 being constituted of a plastic substance there is avoided any necessity for plating, and any likelihood of corrosion of the bearing surface provided by the shoulder portion 42. The valve stem 10 may be constituted of either metal or plastic material, and in any case the provision of the non-corrosive bearing or guide means as constituted by the part 36 prevents any likelihood of binding of the valve stem at any time during the useful life of the device.

Figure 4:
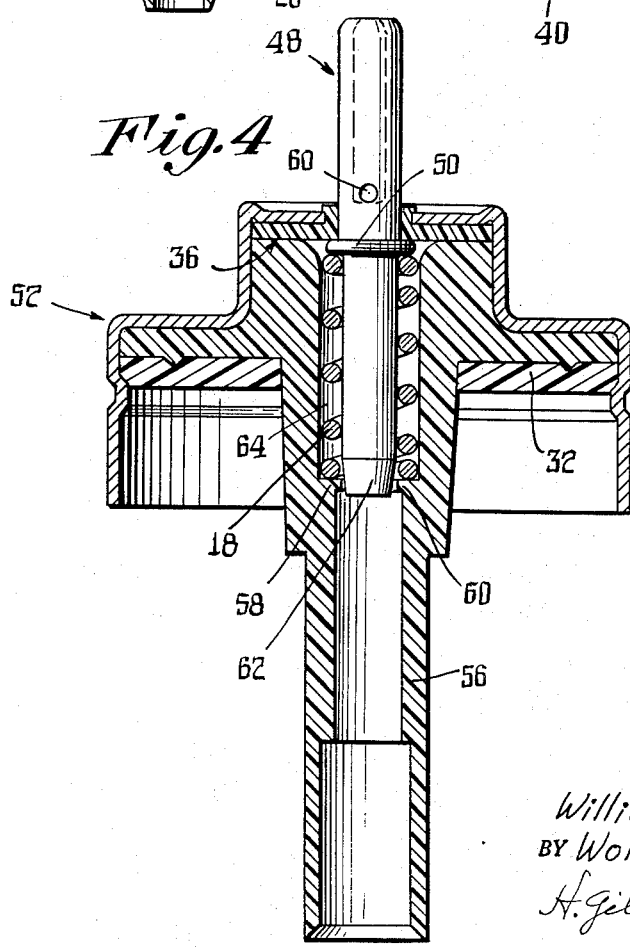
FIG. 4 is a similar axial sectional view of a valve construction, but showing another form of the invention wherein the valve is of the metering type.

It will be understood that the valve construction shown in FIGS. 1-3 is of the non-metering type. Another valve construction embodying the invention and having a metering type valve is illustrated in FIG. 4. In this figure the combined one-piece seal, valve seat and bearing sleeve part as provided by the invention is also indicated by the numeral 36, since it is similar generally in the construction already described above. The valve stem construction includes a stem 48 passing through and bearing in the part 36 and having a valve shoulder 50 engageable with the lower surface of the part, as in the previously described embodiment of the invention. A sheet metal mounting cup 52 is provided, within which there is disposed a valve housing or tank reducer unit 54 and a sealing gasket 32, the housing 54 having a tubular depending portion 56 provided with an internal shoulder 58 constituting an abutment for the compression spring 18. At the shoulder 58 there is provided an annular valve seat 60 arranged for engagement with the tapered lower end portion 62 of the valve stem 48. Thus, when the valve stem 48 is depressed, the valve 60, 62 will be closed and the substance trapped within the bore 64 of the housing 54 will be released through the opening 66 in the valve stem and through the hollow bore of the said stem.

It is to be noted that the action of the resilient part 36 in this embodiment of the invention is similar to that of the embodiment of FIGS. 1-3 as described above in detail, and that all of the stated advantages and features obtained by the use of the part 36 will be had with the embodiment shown in FIG. 4. Likewise, the said advantages and features are had in further embodiments of the invention described below and shown in FIGS. 5 and 6.

Figure 5:
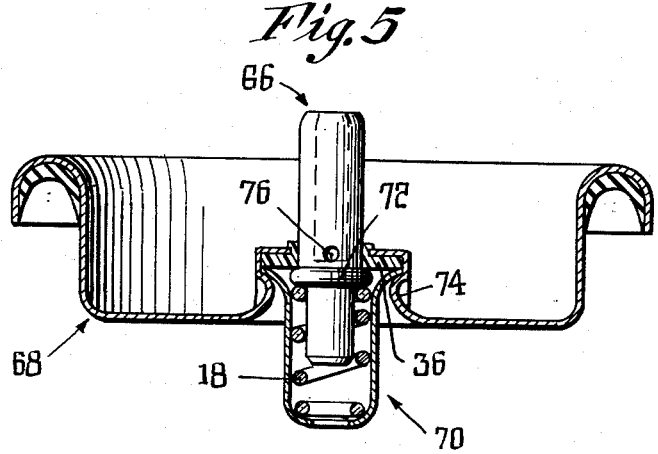
FIG. 5 is an axial sectional view of a valve construction of the non-metering type, illustrating another form of the invention wherein the mounting cup is of the type adapted for use with wide-mouthed containers.

Referring now to FIG. 5 there is illustrated a non-metering valve construction comprising a valve stem 66 which passes through and bears in a resilient one-piece combined seal, valve seat and bearing bushing 36 as provided by the invention. The part 36 is carried in a sheet metal mounting cup 68 having a flanged peripheral portion arranged for engagement with the lip of a wide mouthed container (not shown). There is further provided a valve housing 70 carrying a compression return spring 18 arranged to engage the valve enlargement 72 on the valve stem 66. The valve housing 70 engages the underside of the part 36 as shown, and is retained in the sheet metal cup 68 by inwardly struck portions or nibs 74. It will be understood that when the valve stem 66 is depressed, the opening 76 thereof is disposed below the part 36, whereby the pressurized substance may be discharged through the opening 76 and central passage of the stem. This embodiment of the invention constitutes a non-metering valve.

Figure 6:
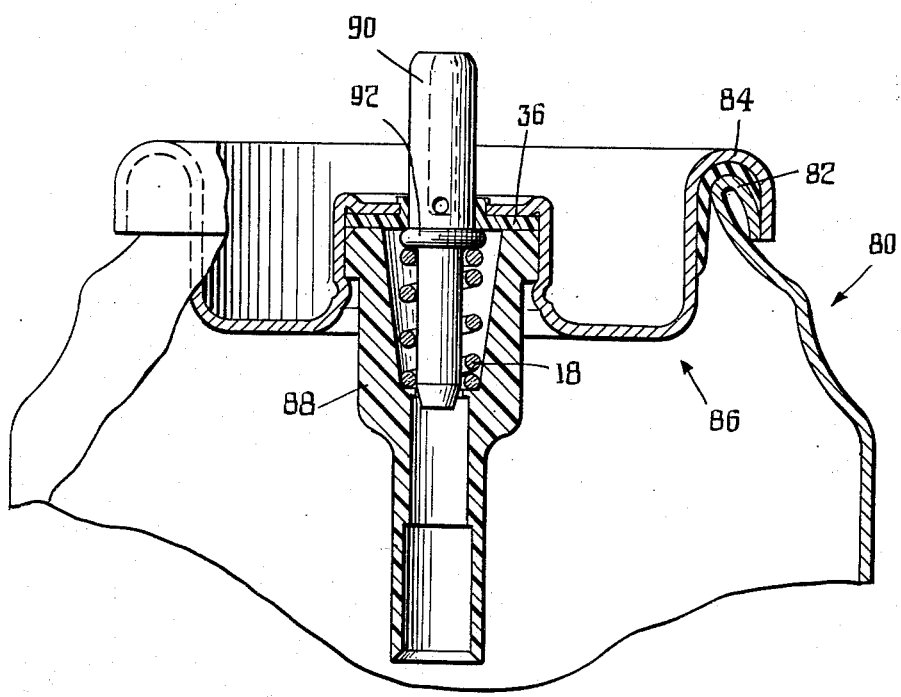
FIG. 6 is an axial sectional view of a valve construction somewhat similar to that of FIG. 3 but showing a metering type valve and a different kind of valve housing, this construction being also adapted for use with wide-mouthed containers.

Another metering type valve construction as provided by the invention is illustrated in FIG. 6. In this figure there is shown a metal can or container 80 having a lip portion 82 engaged by the formed peripheral portion 84 of a sheet metal mounting cup 86. Within the cup 86 there is carried a valve housing 88 which is shown as of molded or cast construction, being preferably formed of plastic substance, the upper end portion of the valve housing 88 engaging and holding in place a resilient one-piece combined seal, valve seat and bearing bushing part 36 as provided by the invention. Passing through and bearing in the part 36 is a valve stem 90 having a valve enlargement 92 engageable with the undersurface of the part 36. A return spring 18 within the valve housing 88 normally retains the stem 90 in the released, valve-closing position shown. Operation of the metering valve shown in FIG. 6 is similar to that of FIG. 4, as explained above.

It will now be understood from the foregoing that we have provided a novel valve construction which has desirable features and advantages in that there is minimized to the greatest possible extent any tendency for leakage of the pressurized substance past the exterior of the valve stem. The valve action is easy and smooth, and the cooperable, relatively movable parts are wear resistant and reliable in their functioning. Moreover, in each of the illustrated embodiments of the invention use is made of the opposed, clamping pressure type action to which the sealing part 36 is subjected, to provide an effective seal without the leakage mentioned. Relatively few components are involved in the present valve construction, the said components being simple, and readily fabricated and assembled whereby the manufacturing cost is held to a low figure. The stated advantages of the present valve construction are had in each of the illustrated embodiments of the invention, as aforesaid, and such advantages are obtained in both non-metering type valves and metering type valves, utilizing either metallic or non-metallic valve stem structures. The tendency for corrosion to occur in metal parts will not adversely affect the present improved valve construction, and thus there is had the utmost reliability of performance throughout the life of the device.

Variations and modifications may be made within the scope of the claim, and portions of the improvements may be used without others.

We claim:

In an aerosol-producing device, a valve construction comprising a hollow valve stem having a passage through it for a pressurized substance and having an exterior enlargement providing a valve face; a cupped sheet metal mounting member for carrying said valve stem, said member having a through opening through which the valve stem extends and in which it is longitudinally movable; a resilient flat washer part through which the valve stem extends and on which it bears, constituted as a one-piece combined seal, valve seat and bearing sleeve for the valve stem, said part having a collar extending into the opening of the mounting member and said collar having means interlocking with the edges of the opening of said member whereby it is held against all movement with respect thereto, and said part having an annular flat washer-like body portion disposed and sealing against one side of the mounting member, said collar projecting from one side of the body portion and extending into the opening of the mounting member to constitute a bushing therein which slidably carries the valve stem and constitutes a bearing therefor and said part having a valve seat for engagement with the valve face of the stem; and a valve housing disposed in said member, provided with a passage therethrough and having an upper end adjacent the valve seat of said part for providing with said member a clamping action to clamp said part whereby it is further held against movement, said passage having a diameter sufficient only to receive the exterior enlargement of the valve stem, thereby providing a maximum surface at the upper end for the said clamping action, said resilient part being constituted of yieldable and deformable substance and the collar thereof being continually compressed between the valve stem and edges of the opening of the mounting member by an interference fit, said collar extending from one side of the mounting member past the other side thereof and projecting from said other side, the projecting edge of the collar having a diameter larger than the bore of the opening in the member immediately adjacent said opening to effect said interlocking engagement therewith, the maximum diameter of the enlargement on the valve stem and the diameter of the through opening of the mounting member being substantially of the same order of magnitude.

References Cited in the file of this patent
UNITED STATES PATENTS

| | | |
|---|---|---|
| 2,766,913 | Wilshusen | Oct. 16, 1956 |
| 2,822,960 | Lengel | Feb. 11, 1958 |
| 2,892,574 | Noe | June 30, 1959 |
| 2,892,576 | Ward | June 30, 1959 |
| 2,965,271 | Soffer | Dec. 20, 1960 |